Jan. 16, 1923.
E. J. FALKINER.
RECEPTACLE FILLING AND MEASURING MACHINE.
FILED MAY 12, 1921.
1,442,137.
3 SHEETS—SHEET 1.
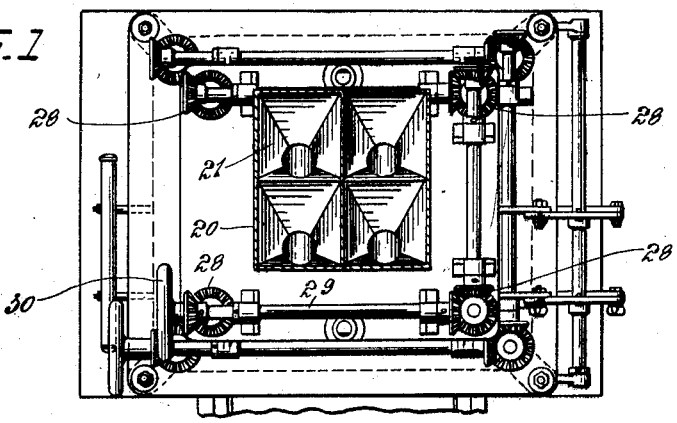
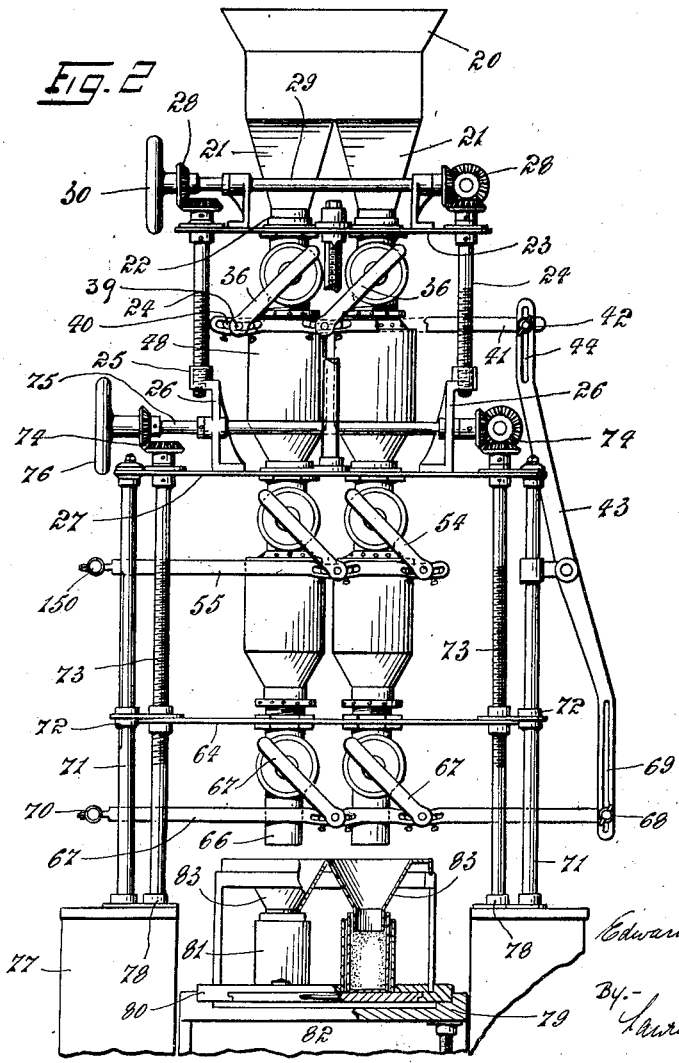
Inventor.
Edward John Falkiner
By-
Lawrence Langner
Atty.

Jan. 16, 1923.
E. J. FALKINER.
RECEPTACLE FILLING AND MEASURING MACHINE.
FILED MAY 12, 1921.
1,442,137.
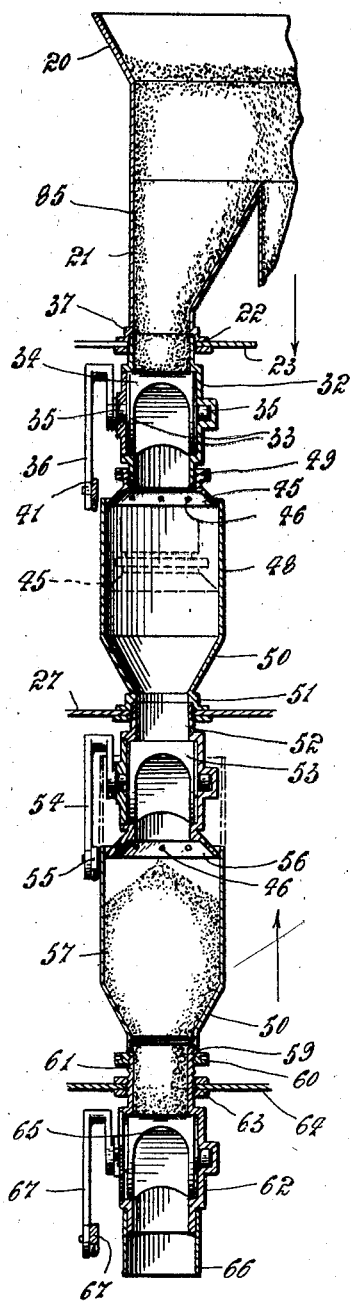
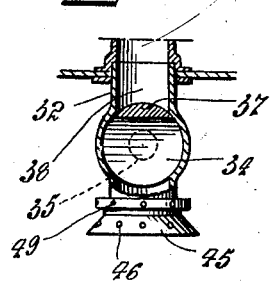
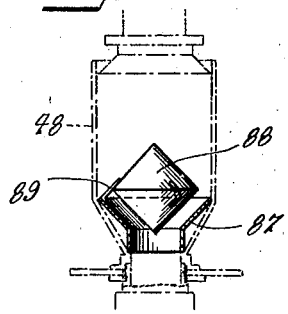
Inventor
Edward John Falkiner
By:
Lawrence Langner Atty.

Jan. 16, 1923. 1,442,137.
E. J. FALKINER.
RECEPTACLE FILLING AND MEASURING MACHINE.
FILED MAY 12, 1921. 3 SHEETS—SHEET 3.
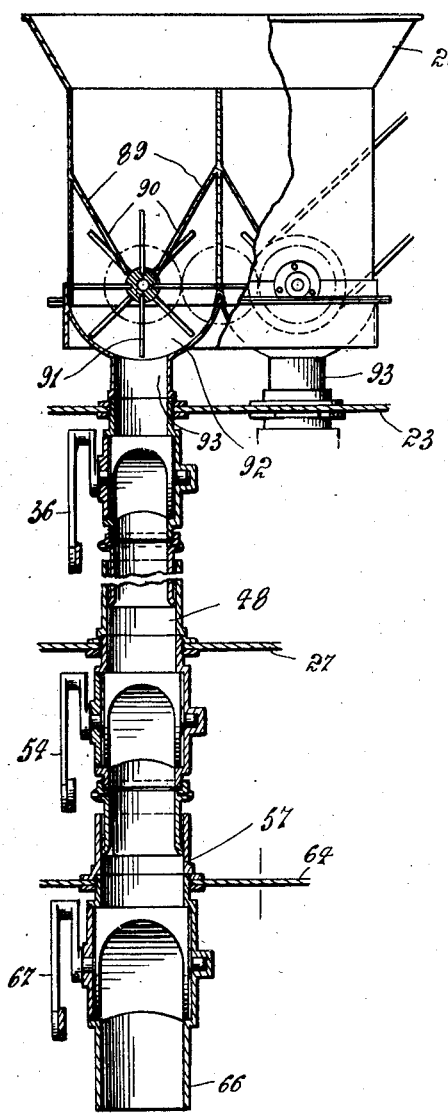
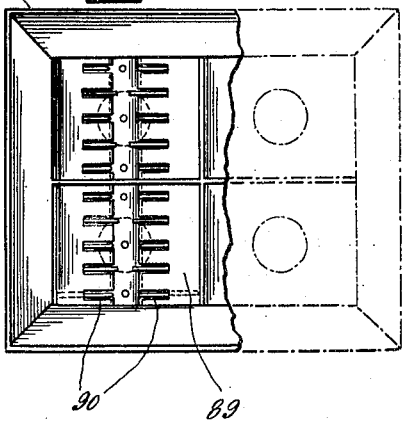
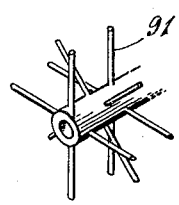

Patented Jan. 16, 1923.

1,442,137

UNITED STATES PATENT OFFICE.

EDWARD JOHN FALKINER, OF PADDINGTON, SYDNEY, NEW SOUTH WALES, AUSTRALIA, ASSIGNOR TO THE MULTIPLEX PACKETING AND FILLING MACHINE COMPANY LIMITED, OF WELLINGTON, NEW ZEALAND, A COMPANY OF NEW ZEALAND.

RECEPTACLE FILLING AND MEASURING MACHINE.

Application filed May 12, 1921. Serial No. 468,990.

*To all whom it may concern:*

Be it known that I, EDWARD JOHN FALKINER, a subject of the King of Great Britain and Ireland, residing at F. H. F., Paddington, Sydney, New South Wales, Australia, have invented a new and useful Improvement in Receptacle Filling and Measuring Machines; and I do hereby declare the following to be a full, clear, and exact description of the same.

This invention relates to measuring apparatus for rapidly subdividing stock quantities of meal, flour, tea, grain and other dry granulose products, such apparatus having its chief utility in warehouses and retail shops for the rapid packeting of stock lines of merchandise in parcels of uniform volume.

The invention consists in certain structural improvements hereinafter particularized in the gravity flow type of such machines in which the goods are measured simultaneously in a plurality of telescopic vessels of adjustable dimensions, and the measured quantities are delivered therefrom directly into bags, cartons or tins.

In the accompanying drawings,

Figure 1, is a top plan view of the machine.

Figure 2, is a side elevational view of same.

Figure 3, is a transverse vertical section through part of the machine, with a modified form of hopper.

Figure 4, is a detail sectional view through one of the valves.

Figure 5, is a fragmentary sectional elevation showing a device used for reducing the capacity of the measuring chambers to adapt them for measuring small volumes of dry materials.

Figure 6, is a transverse sectional elevation, corresponding with Figure 3, of a modified form of the machine including means for agitating flour and other products likely to ball or lump, to ensure flow of same in a free condition, thereby to ensure absence of voids in the measuring vessels.

Figure 7, is a partial top plan view corresponding with Figure 6.

Figure 8, is a detail fragmentary view of the agitator device which is shown in Figure 6.

Referring to Figures 1 to 5, 20 is a hopper subdivided into compartments, one for each measuring device. Each of these compartments is formed below with a leg portion 21 which leads into a collar 22 mounted on a table 23. This table is supported on jack screws 24 working through tapped bosses 25 on brackets 26 which are mounted on the main table 27. The jack screws 24 are all geared through bevel spurs 28 to a shaft 29 upon the end of which a hand-wheel 30 is keyed. By rotating the shaft 29 the jack screws 24 are turned and the table 23 carrying the hopper equipment is raised or lowered as the case may be relatively to the main table 27 for the purpose of varying the capacity of the vessels 48. A valve box 32 is fitted into each collar 22. This valve box 32 has a rocking valve 34 housed in it. The rocking valve is a cylindrical casting with integral stub axles 35. It is slotted through between its cheeks 33 which are neatly contained in pockets in the valve box 32, but a sector portion 37, sufficient to close the neck 38 of the casing 32 is left. On one of the axles 35 is a crank arm 36, and the outer end of the crank arm is pivotally connected as shown at 39 to a slider 40 adjustably located and fixed in a curved slot in a gang bar 41. The gang bar 41 is pivotally connected at 42 to a hand lever 43, the pivot 42 being slidable in a slot 44. A separate gang bar 41 is provided for each set of valves 34. Instead of arranging the valves 34 in pairs as shown, they may be arranged in a multiple series of three or more with two or more of such series in parallel order. The machine is thus equipped for multiple packeting according to the desired number of delivery heads required. Thus, for instance, the machine might contain only one system of measuring apparatus, in which case it would be adapted for filling only one packet in each movement, but it may be constructed with a system of measuring devices symmetrically grouped and all controlled simultaneously from a single hand lever 43, which hand lever is link connected to the several valves 34 and to other valves hereinafter described. As shown in Figures 1 and 2, the machine is constructed with four measuring devices symmetrically grouped under a four division hopper 20.

The lower end of each valve casing 32 has fitted upon it a splayed collar 45 which is vertically adjustable by a screw thread in its neck mounting, and this collar is perforated as shown at 46 in the splayed portion to facilitate discharge of displaced air. The capacity of the measuring vessels is variable. By moving down the table 23 relatively to the table 27 the splayed collar 45 is lowered into the vessel 48, as indicated at the dotted position in Figure 3 for the purpose of limiting the capacity of the vessel to the required measurement for delivery. As shown in full lines the parts are adjusted for the operation of the machine when utilizing the maximum measuring capacity of the vessels 48. 49 are tommy holes in the rim portion of the collar 45 to facilitate its adjustment by rotating it on the foot end of the valve casing 32. This adjustment is required for setting the capacity of the vessels 48 so as to make them all precisely equal. Each vessel 48 terminates below in a coned bottom portion 50 which is formed to a collar 51 which is seated on the table 27. Up into this collar 51 is screwed the top end 52 of a valve chamber which is identical in all respects with the valve chamber 32 the valve 53 contained in it being also identical with the valve 34 already described. The lever arm 54 of each valve 53 is pivotally connected at its end to the operating bar 55. This bar is fitted at its outer end with a hand grip 150 by which it may be reciprocated to rock the valves 53. These valve casings terminate at the foot end in splayed collars 56 which, like the splayed parts 45, are perforated with holes 46 to evacuate displaced air. The collars 56 are close sliding fits for the lower tier measuring chambers 57. The chambers 57 are fitted at the foot ends with a screw collar 59 having tommy holes 60 in its edge to facilitate adjustment on the extended neck portion 61 of the delivery valve casing 62. This casing is fixed by back nuts 63 on the base table 64. The delivery valves 65 and their casings and operating lever equipment are identical with the valves 34 and 53 and the corresponding parts already described. At the lower ends the casings 62 are fitted with spout ends 66. The crank levers 67 of the valves 65 are connected in the same manner as the levers 36 to links 67 which, like the links 41, are provided with a free running pivot bolt 68 working in the slot 69 of the rock lever 43. A hand grip 70 is fitted on the outer ends of the links 67 to enable the operator to move the valves 34 and 65 simultaneously by rocking the levers 43.

The main fixed table 27 is supported on stanchions 71, and the movable table 64 is guided by means of sleeves 72 running on the stanchions 71. The table 64 is raised and lowered relatively to the table 27 by jack screws 73 which are intergeared by means of bevel spurs 74 to a shaft 75, on one end of which a hand wheel 76 is keyed. By turning the wheel 76 the jack screws 73 are rotated simultaneously, and the table 64 is raised or lowered as the case may be relatively to the table 27 to vary the capacity of the measuring vessels 57 by telescoping them over the collars 56. To still further limit the capacity of the measuring vessels 57 the fitting shown in Figure 5 is provided. This fitting consists of an insertable neck piece 87 having supported within it a double cone displacing vessel 88 by means of brackets 89. 77 is a base structure on which stanchions 71 are mounted, 78 being foot step bearings thereon for the lower ends of the jack screws 73. 79 is a table adapted to carry a slide frame 80 in which bags or cartons 81 are seated, within rectangular or circular locating pockets 82. 83 is a multiple mouth filling hopper, the necks of which enter the several boxes or cartons 81.

It will be noted that as shown in Figure 1 the lower portions 21 of the hopper 20 are of prismatic shape, one side being of less angularity than the opposite side. For flour it is desirable that one side of the hopper should be set vertically as shown at 85, Figure 3.

The detail of the design as shown in Figures 6 and 7 is modified in certain respects to fit the apparatus for operating with very fine materials, such as flour which are liable to bridge and to form pockets or voids; such material must be broken up and agitated and aerated in passing through the machine to ensure a uniform segregated condition, otherwise apparent measurement would not correspond with actual quantity measurement. For this purpose, the hoppers are constructed with false bottoms 89 which are slotted at 90 to provide clearance for the spokes 91 of a breaker wheel (Figure 8) to pass through such slots. The material contained in the hopper is thoroughly broken apart in the rotation of the breaker wheel, the spokes 91 of which cause the fine material to pass into the bottom space 92 below the false bottom 89, whence it may run freely to the measuring valve through the hopper neck 93. For materials of the kind described, it is desirable that the measuring vessels 48 and 57 should be cylindrical and that the diameter of the respective vessels and their necks should increase progressively, that is to say the hopper neck at the top should be of smallest diameter and the delivery spout at the foot of largest diameter relatively. Subject to this modification, the structure and arrangement of the parts shown in Figure 6 correspond substantially with that shown in Figures 2 and 3.

In operation, the hand wheel 76 having been turned to adjust the capacity of the vessels 57 simultaneously to the measure required to be delivered, the valves 53 are closed by moving the hand grips 150. The rock lever 43 is then moved over by pulling on the hand grips 70 thereby to open simultaneously the valves 34 and 65. Material contained in the hopper legs 21 now flows into the chambers 48, displaced air escaping through the vents 46. Any material contained in the lower vessels 57 is simultaneously released and falls through the filler hoppers 83 into the packets 81. The lever 43 is now moved reversely thus closing the valves 34 and 65, and then the transfer valves 53 are opened. Material contained in the upper vessels 48 now flows through the valves 53 into the lower vessels 57, displaced air escaping through the vent holes 46. The same operations are repeated the chambers 48 and 57 being thus filled and discharged alternately. In practice the vessels 48 are made considerably larger than the vessels 57 when it is required to use the machine for measuring quantities larger than the capacity of the measuring vessels 57. In such a case the intermediate valves 53 are left open and the valves 34 and 65 linked up to open and close alternately instead of simultaneously. A measure can now be delivered equal to the full capacity of a lower vessel 57 plus a portion or the full capacity of an upper vessel 48, the capacities of the two ranges of vessels 48 and 57 being set to procure the total capacity called for by the jack screw adjustment of the tables 23 and 64 already described.

What I claim is:—

1. In apparatus of the kind described, two groups of telescopic measuring vessels, one group arranged above the other, supply vessels, valves on the outlet ends of said supply vessels, the discharge portions of said valves slidable within the first group of measuring vessels, valves on the outlet ends of said first group of measuring vessels, the outlets of said valves being slidable within the second group of said measuring vessels, and valves controlling the outlets of said second group of measuring vessels, means for adjusting separately the capacity of each group of measuring vessels, and means to enable the said valves between the upper group of measuring vessels and the supply vessels and the said valves controlling the outlet from the lower group of measuring vessels to be operated simultaneously and so arranged that the said valves may open and close together or alternately, substantially as described.

2. Apparatus for the measuring of finely divided dry products, comprising a fixed table, a vertically adjustable table above said fixed table supported on intergeared jack screws, a vertically adjustable table below said fixed table supported on other intergeared jack screws, two groups of telescopic vessels mounted respectively on said fixed table and said lower adjustable table, means dependent on the movable table adjustments for setting the capacity of the two groups of measuring vessels, and means individual to each measuring vessel for adjusting its capacity within fine limits in relation to the other measuring vessels in the same group, gang controlled valves above and below the vessels in the upper group, gang controlled valves at the bottom of the vessels in the lower group, and air venting means in the upper part of each of said vessels, substantially as described.

3. In apparatus of the kind described, measuring vessels, air venting and capacity adjusting means for said measuring vessels, comprising screw adjusting heads with downwardly splayed rim portions, air venting holes in said splayed rim portions, said heads slidable telescopically in said vessels, substantially as described.

4. In apparatus of the kind described the combination of a plurality of measuring vessels arranged in series, fullway valves controlling the inlet and delivery from each of the vessels of the series, said valves progressively increasing in size so that each valve is of larger size than that of the preceding one of the series and each valve comprising casing cheeks, an integral cylindrical plug insertable from one end in said casing cheeks, stub axles on the plug, one at each end, one of said stub axles protruding through one of said casing cheeks and the other being journalled in the other cheek, said plug being slotted through midway of the ends except in one section, which section has a dimension permitting it to set clear of the full bore of the said casing when the valve is in the open position.

5. In apparatus of the kind described, the combination of a stock hopper, a measuring vessel below said hopper, a measuring vessel of smaller capacity below said first mentioned measuring vessel, interlocked valves at the foot of said hopper and below the said smaller measuring vessel, an independent valve between said two measuring vessels, said hopper and vessels being connected in vertical series through said valves, means for separately adjusting the capacities of said vessels, and means for venting displaced air from said vessels, substantially as described.

6. In apparatus of the type described, measuring vessels, means for varying the capacity of said measuring vessels comprising a double cone of smaller circumferential diameter than the said measuring vessels, a carrier ring insertable in the bottom of said measuring vessels, and brackets from said ring supporting said double cone with flow clearance below and around it, substantially as described.

7. In apparatus for filling dry granulose products, a material storage hopper arranged to deliver the material to the measuring devices of the filling apparatus, flow-facilitating and lump-breakage means for said hopper delivery comprising a false truncated V bottom in said hopper, said false bottom transversely slotted at intervals across the apex, a revoluble hub, spikes from said hub registering with and adapted to pass through said slots thereby to aerate the feed of the dry products and maintain the flow thereof, substantially as described.

8. In an apparatus of the kind described, fixed and vertically adjustable tables, two groups of telescopic measuring vessels mounted respectively on said adjustable tables, means dependent on said movable table adjustments for setting the capacity of said two groups of measuring vessels, a hopper, valves controlling the inlets to and discharge from said measuring vessels, the diameter of said measuring vessels and of their inlets and discharge portions increasing progressively so that the inlet from said hopper will be of the smallest diameter and the outlet from the bottom measuring vessel of the largest diameter, substantially as described.

In testimony whereof, I have signed my name to this specification in the presence of two subscribing witnesses.

EDWARD JOHN FALKINER.

Witnesses:
 GRACE A. MACKAY,
 MARSHALL INGALL MAYS.